US012802499B2

(12) United States Patent
Persson et al.

(10) Patent No.: US 12,802,499 B2
(45) Date of Patent: Nov. 17, 2026

(54) TASK-INCONSISTENCY BASED DATA COLLECTION TRIGGER

(71) Applicant: QUALCOMM Incorporated, San Diego, CA (US)

(72) Inventors: Gustav Nils Ture Persson, Ljungsbro (SE); Per Cronvall, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 18/958,096

(22) Filed: Nov. 25, 2024

(65) Prior Publication Data

US 2026/0148593 A1 May 28, 2026

(51) Int. Cl.
*G07C 5/02* (2006.01)

(52) U.S. Cl.
CPC .................................... *G07C 5/02* (2013.01)

(58) Field of Classification Search
CPC ........................................................ G07C 5/02
See application file for complete search history.

(56) References Cited

U.S. PATENT DOCUMENTS

2017/0109644 A1 4/2017 Nariyambut Murali et al.
2018/0348785 A1 12/2018 Zheng et al.
2020/0117950 A1 4/2020 Thompson et al.
2020/0226430 A1* 7/2020 Ahuja ............... B60W 60/0016
2021/0197775 A1 7/2021 Brandin et al.
2022/0019713 A1 1/2022 Gyllenhammar et al.
2022/0194385 A1 6/2022 Geissler et al.
2023/0084761 A1* 3/2023 Koopman, Jr. ....... G06F 18/214 706/12
2024/0294184 A1 9/2024 Askari et al.

OTHER PUBLICATIONS

"Keep your Distance: Determining Sampling and Distance Thresholds in Machine Learning Monitoring"; Jul. 11, 2022 (Year: 2022).*
Yang Z., et al., "Lane Changing Assistance Strategy Based on an Improved Probabilistic Model of Dynamic Occupancy Grids", SpringerLink, Frontiers of Information Technology Electronic Engineering, Nov. 25, 2021, vol. 22, No. 11, pp. 1492-1504.
Anonymous: "Tesla's HydraNet—How Tesla's Autopilot Works", Jul. 1, 2021, 8 Pages, XP093361646, The Whole Document.
International Search Report and Written Opinion—PCT/US2025/053953—ISA/EPO—Feb. 16, 2026.
WAD at CVPR: "[CVPR'21 WAD] Keynote—Andrej Karpathy, Tesla", Jun. 24, 2021, XP093361586, 2 Pages, The Whole Document.

* cited by examiner

*Primary Examiner* — Michael V Kerrigan
(74) *Attorney, Agent, or Firm* — Weaver Austin Villeneuve & Sampson LLP

(57) ABSTRACT

A task-inconsistency based data collection trigger method includes: receiving a plurality of outputs for a plurality of tasks from an advanced driving system (ADS), the plurality of tasks including a task to be verified and remaining tasks; determining a consistency estimate of one or more outputs of the task to be verified based on outputs of the remaining tasks; and generating a data collection trigger based on the consistency estimate being below a consistency threshold. The method may further include collecting data based on the data collection trigger and adding the collected data to one or more data sets for training the ADS.

20 Claims, 5 Drawing Sheets

TASK-INCONSISTENCY BASED DATA COLLECTION TRIGGER

BACKGROUND

Vehicles are becoming more intelligent as the industry moves towards deploying increasingly sophisticated technologies that are capable of assisting drivers in operating a vehicle. The vehicles may be able to detect information about their location and surroundings (e.g., using ultrasound, radar, lidar, an SPS (Satellite Positioning System), and/or an odometer, and/or one or more sensors such as accelerometers, cameras, etc., and/or one or more communication technologies (e.g., for communicating with other vehicles and/or network entities such as roadside units)). The vehicles typically include a control system to interpret information regarding an environment in which the vehicle is disposed to identify hazards.

A driver assistance system may mitigate driving risk for a driver of a vehicle (i.e., a vehicle configured to perceive the environment of the vehicle) and/or for other road users. Driver assistance systems may include one or more active devices and/or one or more passive devices that can be used to determine the environment of the vehicle and possibly to notify a driver of a situation that the driver may be able to address. The driver assistance system may be configured to control various aspects of driving safety and/or driver monitoring. For example, a driver assistance system may control a speed of the vehicle to maintain at least a desired separation (in distance or time) between the vehicle and another vehicle (e.g., as part of an active cruise control system). The driver assistance system may monitor the surroundings of the vehicle, e.g., to maintain situational awareness for the vehicle. The situational awareness may be used for one or more purposes, e.g., to determine whether and how to change lanes, to notify the driver of issues (e.g., another vehicle being in a blind spot of the driver, another vehicle being on a collision path with the ego vehicle), etc. The situational awareness may include information about the vehicle (e.g., speed, location, heading) and/or other vehicles or objects (e.g., location, speed, heading, size, object type, etc.).

A state of a vehicle may be used as an input to a number of driver assistance functionalities, such as an Advanced Driver Assistance System (ADAS). Downstream driving aids such as an ADAS may be safety critical, and/or may give the driver of the vehicle information and/or control the vehicle in some way.

SUMMARY

An example task-inconsistency based data collection trigger method includes: receiving a plurality of outputs for a plurality of tasks from an advanced driving system (ADS), the plurality of tasks including a task to be verified and remaining tasks; determining a consistency estimate of one or more outputs of the task to be verified based on outputs of the remaining tasks; and generating a data collection trigger based on the consistency estimate being below a consistency threshold.

An example vehicle includes: at least one memory; and at least one processor communicatively coupled to the at least one memory and configured to: receive a plurality of outputs for a plurality of tasks from an advanced driving system (ADS), the plurality of tasks comprising a task to be verified and remaining tasks; determine a consistency estimate of one or more outputs of a task to be verified based on outputs of remaining tasks; and generate a data collection trigger based on the consistency estimate being below a consistency threshold.

Another example vehicle includes: means for receiving a plurality of outputs for a plurality of tasks from an advanced driving system (ADS), the plurality of tasks comprising a task to be verified and remaining tasks; means for determining a consistency estimate of one or more outputs of the task to be verified based on outputs of the remaining tasks; and means for generating a data collection trigger based on the consistency estimate being below a consistency threshold.

DETAILED DESCRIPTION

Figure 1:
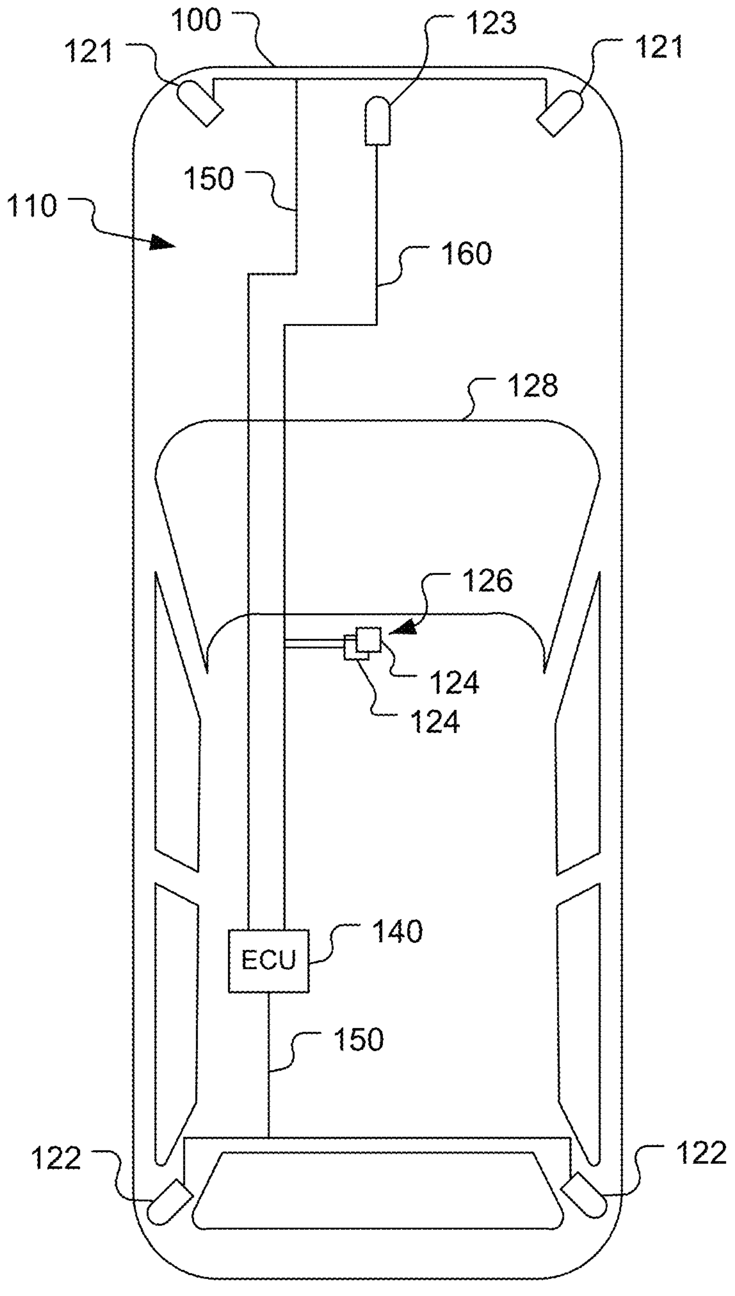
FIG. 1 is a top view of an example vehicle.

Techniques are discussed herein for a task-inconsistency based data collection trigger. A vehicle may include an advanced driving system (ADS), such as an advanced driver assistance system (ADAS) or an automatic driving system (ADS). The ADA may include a stack that implements one or more machine learning (ML) models trained to perceive an environment of a vehicle, such that the ADS may perform one or more driving operations per one or more commands. During production, the ADS may be trained and/or tested using training and/or validation data sets. Each set of data may include one or more scenarios of specific driving situations or functionality. Using at least the data from the vehicle's sensors as input, the one or more ML models of the ADS may perform one or more tasks that generate one or more outputs. The performance of the one or more ML models, and thus the ADS, may depend on the quality, relevance, and diversity of the data sets.

The vehicle may include a data collection trigger unit configured to identify one or more relevant scenarios lacking in the data sets and to trigger the collection of data corresponding to the one or more relevant scenarios. Relevant scenarios may include scenes not currently represented in the training data sets, scenes where the performance of the ADAS is low, and safety critical scenes. The data for the one or more relevant scenarios may be included in the data sets used to train or validate the one or more ML models of the ADS to perform various tasks, such as object detection and predicting the path of a detected object. The data collection trigger unit may be configured to receive one or more outputs of tasks performed by the ADS. To identify relevant scenarios for inclusion in the data sets, the data collection trigger unit may leverage correlations between the tasks. An inconsistency between the one or more outputs of the task to be verified and the outputs of the remaining tasks may indicate that the data corresponding to the scenario is currently missing or not adequately represented in the data sets. The data collection trigger unit may use the inconsistency to trigger the collection of data, and the collected data may be added to the data sets.

Items and/or techniques described herein may provide one or more of the following capabilities, as well as other capabilities not mentioned. The performance of the task-inconsistency based data collection may improve the performance of the ADS by extending training or validation data sets to include data regarding one or more scenarios not currently included or not adequately captured in the data sets. By using inconsistencies between the task outputs to trigger data collection, limitations in the data sets may be more directly detected. More relevant scenarios may be captured than if data collection is triggered based on actions of a human driver. Leveraging inconsistencies between task outputs to trigger data collection may capture a broader range of scenarios than using comparisons of outputs with a shadow mode ADS system. Other capabilities may be provided and not every implementation according to the disclosure must provide any, let alone all, of the capabilities discussed.

Referring to FIG. 1, a vehicle 100 includes a vehicle driver assistance system 110. The driver assistance system 110 may include a number of different types of sensors mounted at appropriate positions on the vehicle 100. For example, the system 110 may include: a pair of divergent and outwardly directed radar sensors 121 mounted at respective front corners of the vehicle 100, a similar pair of divergent and outwardly directed radar sensors 122 mounted at respective rear corners of the vehicle, a forwardly directed LRR sensor 123 (Long-Range Radar) mounted centrally at the front of the vehicle 100, and a pair of generally forwardly directed optical sensors 124 (cameras) forming part of an SVS 126 (Stereo Vision System) which may be mounted, for example, in the region of an upper edge of a windshield 128 of the vehicle 100. Each of the sensors 121 may include an LRR and/or an SRR (Short-Range Radar). The various sensors 121-124 may be operatively connected to a central electronic control system which is typically provided in the form of an ECU 140 (Electronic Control Unit) mounted at a convenient location within the vehicle 100. In the particular arrangement illustrated, the front and rear sensors 121, 122 are connected to the ECU 140 via one or more conventional Controller Area Network (CAN) buses 150, and the LRR sensor 123 and the sensors of the SVS 126 are connected to the ECU 140 via a serial bus 160 (e.g., a faster FlexRay serial bus).

Collectively, and under the control of the ECU 140, the various sensors 121-124 may be used to provide a variety of different types of driver assistance functionalities. For example, the sensors 121-124 and the ECU 140 may provide driving gap identification (e.g., for changing lanes), blind spot monitoring, adaptive cruise control, collision prevention assistance, lane departure protection, and/or rear collision mitigation.

The CAN bus 150 may be treated by the ECU 140 as a sensor that provides ego vehicle parameters to the ECU 140. For example, a GPS (Global Positioning System) module may also be connected to the ECU 140 as a sensor, providing geolocation parameters to the ECU 140.

Figure 2:
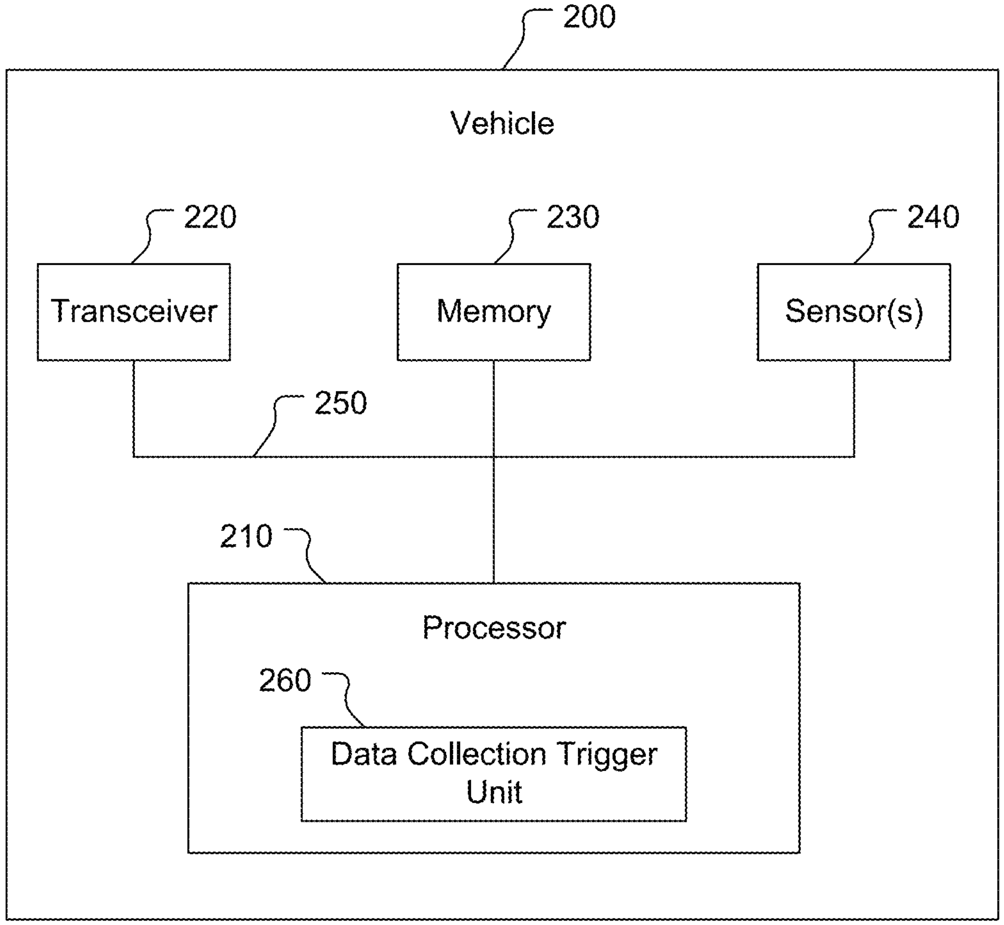
FIG. 2 is a block diagram of components of an example of the vehicle shown in FIG. 1.

Referring also to FIG. 2, a vehicle 200 includes a processor 210 and a memory 230 communicatively coupled to each other by a bus 250. The vehicle 200 may also include a transceiver 220 and/or one or more sensors 240. The vehicle 200 may include a ADS (e.g., the ADAS 316 discussed further herein). Even if referred to in the singular, the processor 210 may include one or more processors, the transceiver 220 may include one or more transceivers (e.g., one or more transmitters and/or one or more receivers), and the memory 230 may include one or more memories. The processor 210 may include one or more hardware devices, e.g., a central processing unit (CPU), a microcontroller, an application specific integrated circuit (ASIC), etc. The processor 210 may comprise multiple processors including a general-purpose/application processor, a Digital Signal Processor (DSP), a modem processor, a video processor, and/or a sensor processor. The memory 230 may be a non-transitory, processor-readable storage medium that may include random access memory (RAM), flash memory, disc memory, and/or read-only memory (ROM), etc. The memory 230 may store software which may be processor-readable, processor-executable software code containing instructions that are configured to, when executed, cause the processor 210 to perform various functions described herein. Alternatively, the software may not be directly executable by the processor 210 but may be configured to cause the processor 210, e.g., when compiled and executed, to perform the functions. The transceiver 220 may include one or more components such as a wireless transceiver and possibly a wired transceiver, e.g., as discussed below with respect to FIG. 3.

The description herein may refer to the processor 210 performing a function, but this includes other implementations such as where the processor 210 executes instructions of software (stored in the memory 230) and/or firmware. The description herein may refer to the vehicle 200 performing a function as shorthand for one or more appropriate components (e.g., the processor 210 and the memory 230) of the vehicle 200 performing the function. The processor 210 (possibly in conjunction with the memory 230 and, as appropriate, the transceiver 220 and/or the sensor(s) 240) may include a data collection trigger unit 260. The data collection trigger unit 260 may be configured to perform operations to generate a data collection trigger based on a consistency estimate of one or more outputs of a task of the ADS to be verified based on the outputs of the remining tasks of the ADS. The data collection trigger unit 260 is discussed further below, and the description may refer to the processor 210 generally, or the vehicle 200 generally, as performing any of the functions of the data collection trigger unit 260, with the vehicle 200 being configured to perform the function(s).

Figure 3:
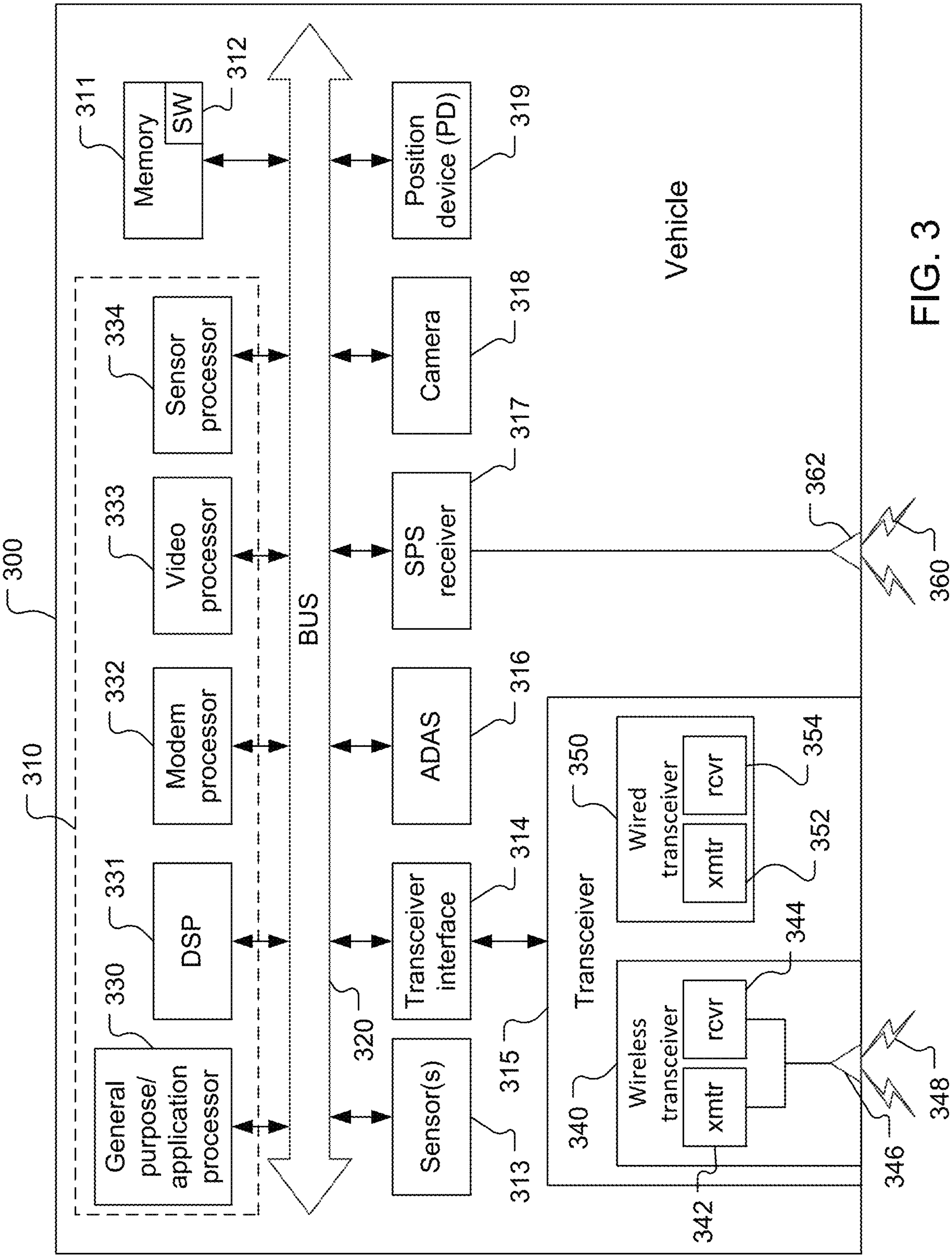
FIG. 3 is a block diagram of components of an example of the vehicle shown in FIG. 2.

Referring also to FIG. 3, a vehicle 300 (which may be a vehicle user equipment (VUE)) comprises a computing platform including a processor 310, memory 311 including software (SW) 312, one or more sensors 313, a transceiver interface 314 for a transceiver 315 (that includes a wireless transceiver 340 and a wired transceiver 350), the ADAS 316 (Advanced Driver Assistance System), a Satellite Positioning System (SPS) receiver 317, a camera 318, and a position device (PD) 319. Even if referred to in the singular, each of the components of the vehicle 300 may include one or more of such components, e.g., the processor 310 may include one or more processors, and the memory 311 may include one or more memories. The processor 310, the memory 311, the sensor(s) 313, the transceiver interface 314, the ADAS 316, the SPS receiver 317, the camera 318, and the position device 319 may be communicatively coupled to each other by a bus 320 (which may be configured, e.g., for optical and/or electrical communication). One or more of the shown apparatus may be omitted from the vehicle 300. The processor 310 may include one or more hardware devices, e.g., a central processing unit (CPU), a microcontroller, an application specific integrated circuit (ASIC), etc. The processor 310 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for RF (radio frequency) sensing (with one or more (cellular) wireless signals transmitted and reflection(s) used to identify, map, and/or track an object), and/or ultrasound, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the ego vehicle 300 for connectivity. The memory 311 is a non-transitory storage medium that may include random access memory (RAM), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description herein may refer to the processor 310 performing a function, but this includes other implementations such as where the processor 310 executes software and/or firmware. The description herein may refer to the processor 310 performing a function as shorthand for one or more of the processors 330-334 performing the function. The description herein may refer to the vehicle 300 performing a function as shorthand for one or more appropriate components of the vehicle 300 performing the function. The processor 310 may include a memory with stored instructions in addition to and/or instead of the memory 311. Functionality of the processor 310 (explicitly or implicitly as an example of the processor 210) is discussed more fully below.

The configuration of the vehicle 300 shown in FIG. 3 is an example and not limiting of the disclosure, including the claims, and other configurations may be used. For example, an example configuration of the vehicle 300 may include one or more of the processors 330-334 of the processor 310, the memory 311, a wireless transceiver, one or more of the sensor(s) 313, the ADAS 316, the SPS receiver 317, the camera 318, and/or the PD 319.

The vehicle 300 may include the sensor(s) 313 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the ego vehicle 300 in three dimensions) and/or one or more gyroscopes (e.g., three-dimensional gyroscope(s)). The sensor(s) 313 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more humidity sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the general-purpose/application processor 330 in support of one or more applications such as, for example, applications directed to positioning and/or navigation operations.

The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The sensor(s) 313 may be useful to determine whether the vehicle 300 is fixed (stationary) or mobile. For example, based on the information obtained/measured by the sensor(s) 313, the vehicle 300 may determine that the vehicle 300 has moved, determine the relative displacement/distance (e.g., via dead reckoning, or sensor-based location determination, or sensor-assisted location determination enabled by the sensor(s) 313), and/or determine present location and/or velocity. In another example, for relative positioning information, the sensors/IMU can be used to determine the angle and/or orientation of the other device with respect to the vehicle 300, etc.

The IMU may be configured to provide measurements about a direction of motion and/or a speed of motion of the vehicle 300, which may be used in relative location and/or motion determination of the vehicle 300 and/or one or more other objects (e.g., vehicles) relative to the vehicle 300. For example, one or more accelerometers and/or one or more gyroscopes of the IMU may detect, respectively, a linear acceleration and a speed of rotation of the vehicle 300. The linear acceleration and speed of rotation measurements of the vehicle 300 may be integrated over time to determine an instantaneous direction of motion as well as a displacement of the vehicle 300. The instantaneous direction of motion and the displacement may be integrated to track a location of the vehicle 300. For example, a reference location of the vehicle 300 may be determined, e.g., using the SPS receiver 317 (and/or by some other means) for a moment in time and measurements from the accelerometer(s) and gyroscope(s) taken after this moment in time may be used in dead reckoning to determine present location of the vehicle 300 based on movement (direction and distance) of the ego vehicle 300 relative to the reference location.

The magnetometer(s) may determine magnetic field strengths in different directions which may be used to determine orientation of the vehicle 300. For example, the orientation may be used to provide a digital compass for the vehicle 300. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 310.

The transceiver 315 may include a wireless transceiver 340 and a wired transceiver 350 configured to communicate with other devices through wireless connections and wired connections, respectively. For example, the wireless transceiver 340 may include a wireless transmitter 342 and a wireless receiver 344 coupled to an antenna 346 for transmitting (e.g., on one or more uplink channels and/or one or more sidelink channels) and/or receiving (e.g., on one or more downlink channels and/or one or more sidelink channels) wireless signals 348 and transducing signals from the wireless signals 348 to guided (e.g., wired electrical and/or optical) signals and from guided (e.g., wired electrical and/or optical) signals to the wireless signals 348. The wireless transmitter 342 includes appropriate components (e.g., a power amplifier and a digital-to-analog converter). The wireless receiver 344 includes appropriate components (e.g., one or more amplifiers, one or more frequency filters, and an analog-to-digital converter). The wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with Transmission/Reception Points (TRPs) and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi® short-range wireless communication technology, WiFi® Direct (WiFi-D), Bluetooth® short-range wireless communication technology, Zigbee® short-range wireless communication technology, etc. New Radio may use mm-wave frequencies and/or sub-6 GHZ frequencies. The wired transceiver 350 may include a wired transmitter 352 and a wired receiver 354 configured for wired communication, e.g., a network interface that may be utilized to communicate with an NG-RAN (Next Generation-Radio Access Network) to send communications to, and receive communications from, the NG-RAN. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315. The wireless transmitter 342, the wireless receiver 344, and/or the antenna 346 may include multiple transmitters, multiple receivers, and/or multiple antennas, respectively, for sending and/or receiving, respectively, appropriate signals.

The ADAS 316 may perform one or more driving operations per one or more commands. For example, the ADAS 316 may include components to control a throttle, brakes, and a steering mechanism of the vehicle 300, and may respond to one or more commands, e.g., from the processor 310, to control the throttle, brakes, and/or steering mechanism.

The SPS receiver 317 (e.g., a Global Positioning System (GPS) receiver) may be capable of receiving and acquiring SPS signals 360 via an SPS antenna 362. The SPS antenna 362 is configured to transduce the SPS signals 360 from wireless signals to wired signals, e.g., electrical or optical signals, and may be integrated with the antenna 346. The SPS receiver 317 may be configured to process, in whole or in part, the acquired SPS signals 360 for estimating a location of the vehicle 300. For example, the SPS receiver 317 may be configured to determine location of the vehicle 300 by trilateration using the SPS signals 360. The general-purpose/application processor 330, the memory 311, the DSP 331 and/or one or more specialized processors (not shown) may be utilized to process acquired SPS signals, in whole or in part, and/or to calculate an estimated location of the ego vehicle 300, in conjunction with the SPS receiver 317. The memory 311 may store indications (e.g., measurements) of the SPS signals 360 and/or other signals (e.g., signals acquired from the wireless transceiver 340) for use in performing positioning operations. The general-purpose/application processor 330, the DSP 331, and/or one or more specialized processors, and/or the memory 311 may provide or support a location engine for use in processing measurements to estimate a location of the vehicle 300.

The vehicle 300 may include the camera 318 for capturing still or moving imagery. The camera 318 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown).

The position device (PD) 319 may be configured to determine a position of the vehicle 300, motion of the vehicle 300, and/or relative position of the vehicle 300, and/or time. For example, the PD 319 may communicate with, and/or include some or all of, the SPS receiver 317. The PD 319 may work in conjunction with the processor 310 and the memory 311 as appropriate to perform at least a portion of one or more positioning methods, although the description herein may refer to the PD 319 being configured to perform, or performing, in accordance with the positioning method(s). The PD 319 may also or alternatively be configured to determine location of the vehicle 300 using terrestrial-based signals (e.g., at least some of the wireless signals 348) for trilateration, for assistance with obtaining and using the SPS signals 360, or both. The PD 319 may be configured to determine location of the vehicle 300 based on a cell of a serving base station (e.g., a cell center) and/or another technique such as E-CID. The PD 319 may be configured to use one or more images from the camera 318 and image recognition combined with known locations of landmarks (e.g., natural landmarks such as mountains and/or artificial landmarks such as buildings, bridges, streets, etc.) to determine location of the vehicle 300. The PD 319 may be configured to use one or more other techniques (e.g., relying on the self-reported location of the vehicle 300 (e.g., part of a position beacon of the ego vehicle 300)) for determining the location of the vehicle 300, and may use a combination of techniques (e.g., SPS and terrestrial positioning signals) to determine the location of the vehicle 300. The PD 319 may include one or more of the sensors 313 (e.g., gyroscope(s), accelerometer(s), magnetometer(s), etc.) that may sense orientation and/or motion of the vehicle 300 and provide indications thereof that the processor 310 (e.g., the general-purpose/application processor 330 and/or the DSP 331) may be configured to use to determine motion (e.g., a velocity vector and/or an acceleration vector) of the vehicle 300. The PD 319 may be configured to provide indications of uncertainty and/or error in the determined position and/or motion. Functionality of the PD 319 may be provided in a variety of manners and/or configurations, e.g., by the general-purpose/application processor 330, the transceiver 315, the SPS receiver 317, and/or another component of the ego vehicle 300, and may be provided by hardware, software, firmware, or various combinations thereof.

Figure 4:
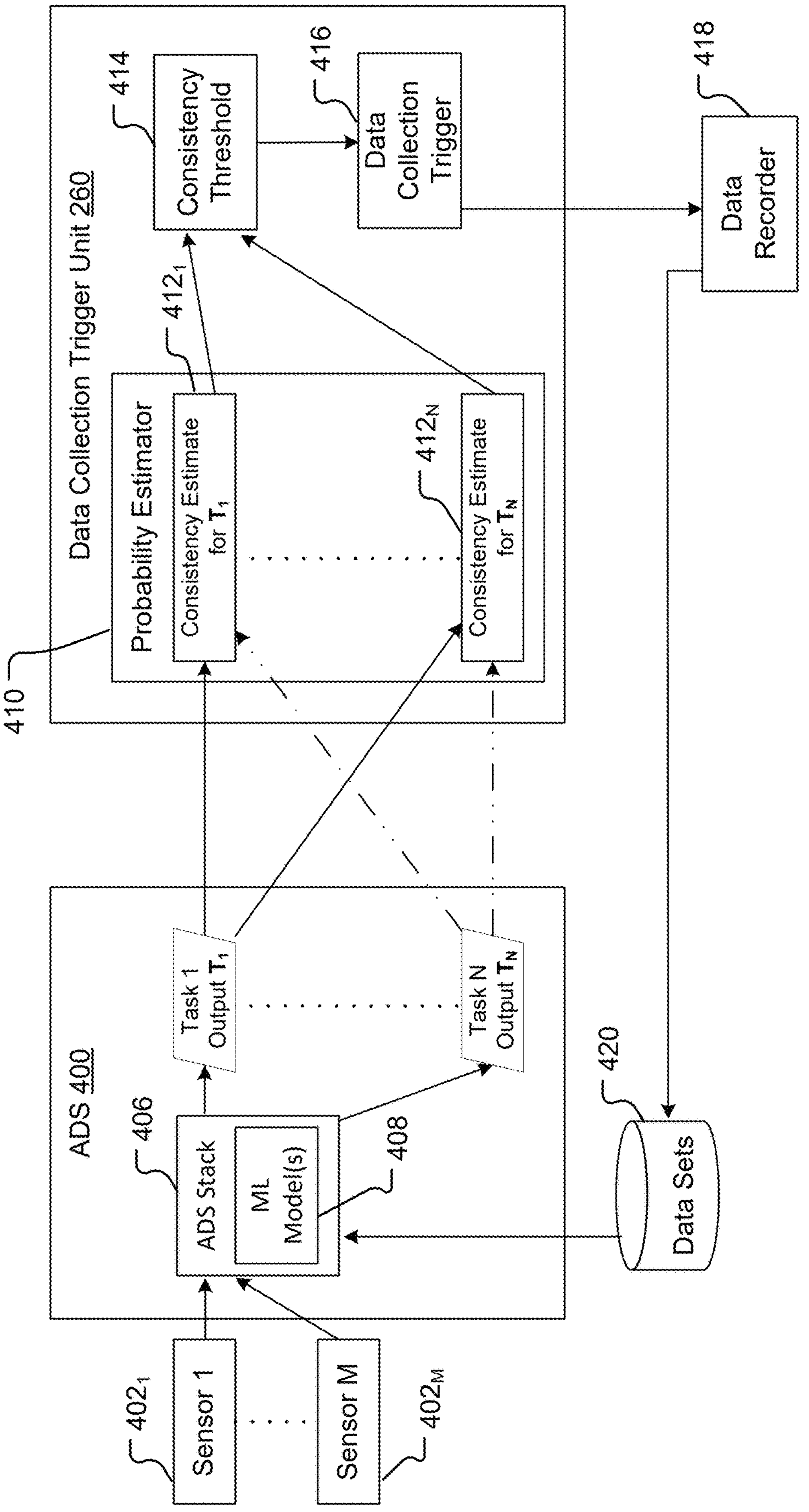
FIG. 4 is a block diagram of components of an example of a data collection trigger unit interfacing with an advanced driving system (ADS).

Referring to FIG. 4, the advanced driving system (ADS 400) may include a ADS stack 406 implementing one or more machine learning (ML) models 408, and data sets 420 that may include training data sets and/or validation data sets. The one or more ML models 408 may be trained, using training data sets, to perceive an environment of a vehicle (e.g., vehicle 300), such that the ADS 400 may perform one or more driving operations per one or more commands. The validation data sets may be used to tune the parameters of the one or more ML models 408 and produce metrics of the selection of models (differing, for example, in terms of hyperparameters or architectures). Test or product validation data sets may also be used to determine product performance at a certain stage of development. Each set of data may include data relevant to a scenario or a finite situation that may be captured by the one or more sensors $\mathbf{402}_1$-$\mathbf{402}_M$ of the vehicle 300. For example, data relevant to different traffic situations or events, vehicle types, road types, the environment, the road, the weather, light conditions, etc. may be captured by the one or more sensors $\mathbf{402}_1$-$\mathbf{402}_M$. The ADS 400 may receive data from at least one or more sensors $\mathbf{402}_1$-$\mathbf{402}_M$ of the vehicle 300, such as cameras, LiDAR, and some combination of other components as described above with reference to FIG. 3. Using at least the data from the one or more sensors $\mathbf{402}_1$-$\mathbf{402}_M$ as input to the one or more ML models 408, the ADS 400 may perform one or more tasks that generate one or more outputs $T_1$-$T_N$. A task may relate to a processing, by the ADS stack 400, of a set of data from one or more sensors $\mathbf{402}_1$-$\mathbf{402}_M$ of the vehicle 300 to produce one or more outputs for a specific purpose. A task may be the detection of a specific class or group of similar classes of objects. For example, a task may include lane detection, vehicle detection, pedestrian detection, and the detection of other objects in the vehicle's environment, such as road boundaries, traffic lights, and street signs. The one or more outputs $T_1$-$T_N$ may include information regarding a detected object, such as object type, location, and state. The ADS 400 may make driving decisions and perform driving operations via one or more commands based on the outputs $T_1$-$T_N$ of the tasks. Correlations between the tasks may be expected based on the objects detected. For example, a correlation may be expected between road boundaries and placement of traffic signs, sidewalks, and/or street signs. For another example, correlations may be expected between sidewalks or road boundaries and a predicted path of a detected pedestrian. The correlations between the tasks may be leveraged by the data collection trigger unit 260, as described further below.

The performance of the one or more ML models 408, and thus the ADS 400, may depend on the quality, relevance, and diversity of the data sets 420. To sufficiently validate the one or more ML models 408, a large amount of annotated data may be required. Triggering data collection based on the relevancy of scenarios may reduce the amount of bandwidth, storage, and/or labor required to collect and annotate the data. Relevant scenarios may include scenes not currently represented in the data sets 420, scenes where the performance of the one or more ML models 408 is low, and safety critical scenes.

The data collection trigger unit 260 may be configured to receive the one or more outputs $T_1$-$T_N$ from the ADS 400. In contrast to the ADS 400, the data collection trigger unit 260 may not be configured to receive the inputs directly from the one or more sensors $\mathbf{402}_1$-$\mathbf{402}_M$. To identify relevant scenarios for inclusion in the data sets 420, the data collection trigger unit 260 leverages the fact that one or more outputs of a task to be verified (e.g., lane detection) correlates with expected outputs of other tasks (e.g., vehicle detection). An inconsistency between the one or more outputs of the task to be verified and the outputs of the remaining tasks may indicate that the data is currently missing or not adequately represented in the data sets 420. The data collection trigger unit 260 may use the inconsistency to trigger the collection of data, and the collected data may be added to the data sets 420.

To identify inconsistencies in the task outputs $T_1$-$T_N$, the data collection trigger unit 260 may be configured with a probability estimator 410, which may receive as inputs the task outputs $T_1$-$T_N$. The probability estimator 410 may determine a consistency estimate (e.g., consistency estimate $\mathbf{412}_N$) for one or more outputs (e.g., output $T_N$) of a task to be verified given the outputs (e.g., outputs $T_1$-$T_{N-1}$) of the remaining tasks. The consistency estimate $\mathbf{412}_N$ may be compared with a consistency threshold 414 to determine a level of consistency between the one or more outputs $T_N$ and the remaining outputs, $T_1$-$T_{N-1}$, from a probabilistic perspective. The one or more outputs $T_N$ may be determined to be inconsistent with the remaining outputs, $T_1$-$T_{N-1}$, based on the consistency estimate $\mathbf{412}_N$ being below the consistency threshold 414. In response, the data collection trigger unit 260 may generate a data collection trigger 416. A data recorder 418 may collect data based on the data collection trigger 416. For example, the data may include numerical data, categorical data, text data, image data, times series data, audio data, and/or other data relevant to the scenario. The data may be structured in a way that allows the one or more ML models 408 to identify patterns and make predictions based on features and any annotations or labels. The collected data may be stored with the data sets 420 to extend the training or validation data sets used to train or tune the one or more ML models 408. The determination of the consistency estimate $\mathbf{412}_1$-$\mathbf{412}_N$ and the comparison with the consistency threshold 414 may be repeated for the other tasks.

For example, situations where inconsistencies between task outputs may trigger the generation of the data collection trigger 416 may include: the existence and traveling direction of a road user may be inconsistent with the estimated road layout; pedestrian location and motion may be inconsistent with the location and motion of the vehicle; traffic sign locations and classes may be inconsistent with the estimated road layout and detected road symbols; traffic light locations and types may be inconsistent with the estimated road layout and detected road symbols; road user location and motion may be inconsistent with the location and state of detected traffic lights; and object detections may be inconsistent with the estimated free space or drivable surface.

For example, the inconsistency between tasks may be measured based on a likelihood estimate for the output of one task given the outputs of the remaining tasks. The likelihood estimate may be compared with a likelihood threshold, where a data collection trigger 416 may be generated in response to the likelihood estimate being below the likelihood threshold. The determination of the likelihood estimate and the comparison with the likelihood threshold may be represented as follows:

$$\text{trigger} := \bigvee_{i=1}^{N} \left[ p\left(T_i \mid \{T_j\}_{j \neq i}\right) < \tau_i \right] \quad (1)$$

where

T is the one or more outputs from a task with the index i identifying the task to be verified, j is the index of the remaining tasks, N is the total number of tasks, p is the conditional probability of the one or more outputs from the task with index i, τ is the likelihood threshold, and V is a logical OR operator (represented by a descending wedge).

The likelihood threshold τ may be tuned to achieve a desired trigger frequency for the collection of data. In one implementation, different likelihood thresholds may be configured for different task types. For example, a higher likelihood threshold may be configured for safety critical tasks, such that data collection for scenarios with safety critical tasks may be triggered more frequently.

In one implementation, the probability estimator 410 may utilize a neural network, such as a convolutional neural network (CNN) or a transformer neural network, that is configured to verify one or more tasks performed by the ADS 400. The neural network may estimate the consistency or probability of the occurrence of one or more outputs of a specific task to be verified given the outputs of other tasks based on correlations between the tasks. The data collection trigger unit 260 may train the neural network to output probability estimates using the output from other tasks as input. The data collection trigger unit 260 may be adapted for the extension of specific data sets, e.g., the training or the validation data sets, by training the probability estimator 410 on the corresponding data. For example, the probability estimator 410 may be implemented by quantizing the output space of different properties of the tasks into a multi-dimensional grid, and a classifier may be trained to generate a probability distribution over the output space. The probability distribution may be probed using the properties of one or more task outputs by the ADS 400 to determine the consistency estimate 412$_1$-412$_N$. The classifier may be trained using annotated training or validation data sets, unannotated training or validation data sets, or the actual outputs from the ADS 400. The one or more outputs ($T_i$) of the task to be verified may be used to define the target outputs, and the outputs of the other tasks corresponding to the same scenario may be used as input. For example, a vehicle detection task may output detections with confidence, position, size and orientation. The data collection trigger unit 260 may train the classifier using road boundaries output from a road boundary detection task as input to the classifier to generate a probability distribution of relevant properties of vehicle detections. This allows the data collection trigger unit 260 to compare the vehicle detection output in a specific scenario to the corresponding probability distribution to determine its likelihood.

In another implementation, the classifier may be configured to directly estimate the likelihood of the one or more outputs ($T_i$) of the task to be verified by using the outputs of the tasks (including $T_i$) as input. In the training of the classifier, one or more outputs ($T_i$) from unmodified samples in the training sets as positive samples and the outputs combined from different samples as negative samples to introduce inconsistencies for training purposes.

In another implementation, conditional density estimation methods, e.g., a Kernel Mixture Network, a Mixture Density Network or a Normalizing Flow Estimator, may be used to estimate the conditional probability distribution.

In another implementation, the data collection trigger unit 260 may be configured as a module that generates an output based on the outputs $T_1$-$T_N$ of the ADS 400. The output from the data collection trigger unit 260 may be in a format that matches the format of the outputs $T_1$-$T_N$ of the ADS 400. A distance measure between the outputs $T_1$-$T_N$ of the ADS 400 and the output of the data collection trigger unit 260 may be determined. The distance measure may be compared with a threshold distance, and the data collection trigger unit 260 may generate the data collection trigger 416 based on the distance measure exceeding a threshold distance.

In another implementation, the data collection trigger unit 260 may function as a safety monitor, where the data collection trigger unit 260 may generate an indication of an uncertain scenario interpretation instead of, or in addition to, generating the data collection trigger 416 based on the consistency estimate being below the consistency threshold.

In one embodiment, the data collection trigger unit 260 may be a component of the vehicle 300 with an interface with the ADS 400. In another embodiment, the data collection trigger unit 260 may be a component of a server, where the ADS 400 transmits the outputs $T_1$-$T_N$ to the server over a network. The data collection trigger unit 260 at the server determines the consistency estimate 412$_1$-412$_N$ of one or more outputs of a task to be verified. The server may generate a data collection trigger 416 based on the consistency estimate 412$_1$-412$_N$ being below the consistency threshold 414. The ADS 400 may receive the data collection trigger 416 from the server, and the data recorder 418 may collect data based on the receipt of the data collection trigger 416 from the server.

Figure 5:
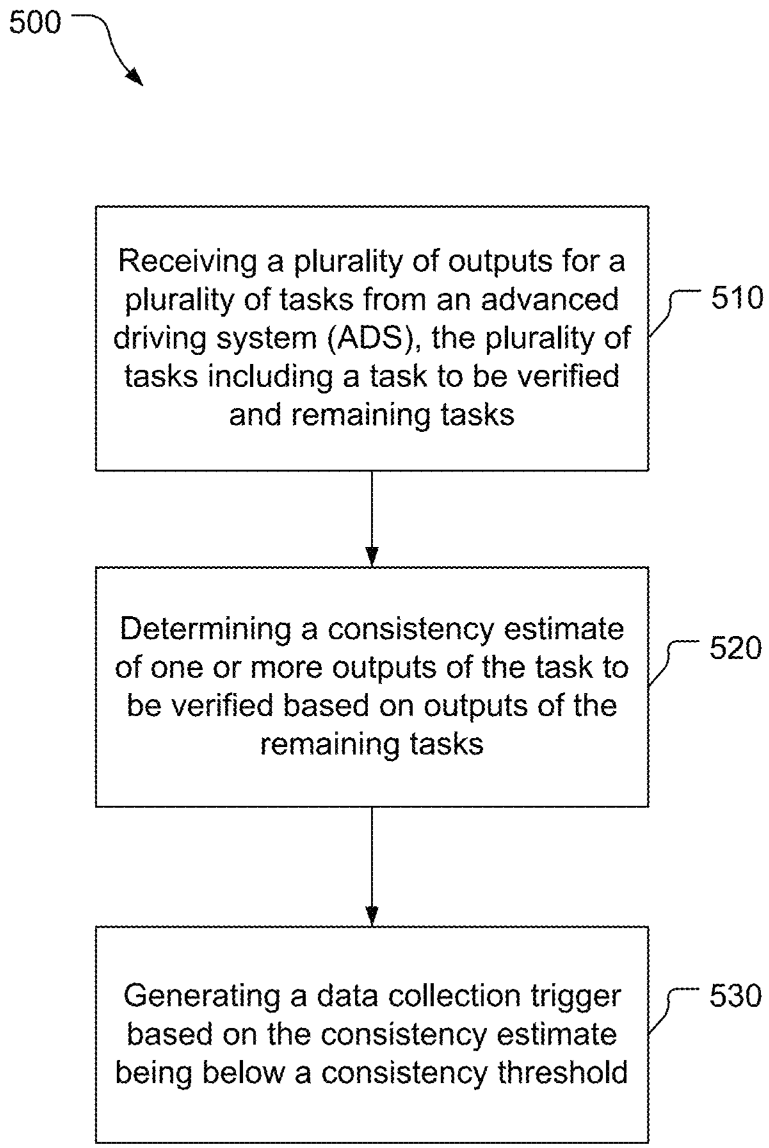
FIG. 5 is a block flow diagram of an example of a task-inconsistency based data collection trigger method.

Referring to FIG. 5, with further reference to FIGS. 1-4, a task-inconsistency based data collection trigger method 500 includes the stages shown. The method 500 is, however, an example and not limiting. The method 500 may be altered, e.g., by having one or more stages added, removed, rearranged, combined, performed concurrently, and/or having one or more stages split into multiple stages.

At stage 510, the method 500 includes receiving a plurality of outputs for a plurality of tasks from an ADS, the plurality of tasks including a task to be verified and remaining tasks. For example, the data collection trigger unit 260 may receive the outputs $T_1$-$T_N$ from the ADS 400. The processor 210, possibly in combination with the memory 230, may comprise means for receiving the plurality of outputs for the plurality of tasks from the ADS, the plurality of tasks including a task to be verified and remaining tasks.

At stage 520, the method 500 includes determining a consistency estimate of one or more outputs of the task to be verified based on outputs of the remaining tasks. For example, the probability estimator 410 of the data collection trigger unit 260 may determine a consistency estimate 412$_N$ for one or more outputs $T_N$ of a task to be verified based on the remaining outputs, $T_1$-$T_{N-1}$, of the remaining tasks. The processor 210, possibly in combination with the memory 230, may comprise means for determining the consistency estimate of one or more outputs of the task to be verified based on outputs of the remaining tasks.

At stage 530, the method 500 includes generating a data collection trigger based on the consistency estimate being below a consistency threshold. For example, the data collection trigger unit 260 may compare the consistency estimate 412$_N$ with a consistency threshold 414 to determine a level of consistency between the one or more outputs $T_N$ and the remaining outputs, $T_1$-$T_{N-1}$. The one or more outputs $T_N$ may be determined to be inconsistent with the remaining outputs, $T_1$-$T_{N-1}$, based on the consistency estimate 412$_N$ being below the consistency threshold 414. In response, the data collection trigger unit 260 may generate a data collection trigger 416. The processor 210, possibly in combination with the memory 230, may comprise means for generating a data collection trigger based on the consistency estimate being below a consistency threshold.

Implementation Examples

Implementation examples are provided in the following numbered clauses.

Clause 1. A task-inconsistency based data collection trigger method, comprising: receiving a plurality of outputs for a plurality of tasks from an advanced driving system (ADS), the plurality of tasks comprising a task to be verified and remaining tasks; determining a consistency estimate of one or more outputs of the task to be verified based on outputs of the remaining tasks; and generating a data collection trigger based on the consistency estimate being below a consistency threshold.

Clause 2. The method of clause 1, further comprising: collecting data based on the data collection trigger; and adding the collected data to one or more data sets for training the ADS.

Clause 3. The method of clause 1, wherein the determining of the consistency estimate comprises: determining a probability of an occurrence of the one or more outputs of the task to be verified given the outputs of the remaining tasks based on correlations between the plurality of tasks.

Clause 4. The method of clause 3, wherein the determining of the probability comprises: quantizing an output space of one or more properties of the plurality of tasks; generating a probability distribution over the output space; and probing the probability distribution using the one or more properties to determine the probability of the occurrence of the one or more outputs of the task to be verified.

Clause 5. The method of clause 3, wherein the determining of the probability comprises: estimating, by a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

Clause 6. The method of clause 1, wherein the determining of the consistency estimate comprises: determining the consistency estimate of the occurrence of the one or more outputs of the task to be verified based on one or more conditional density estimation methods.

Clause 7. The method of clause 1, wherein the determining of the consistency estimate comprises: generating an output corresponding to a scenario based on the plurality of outputs of the plurality of tasks, the output comprising an interpretation of the scenario; determining a distance measure between the plurality of outputs of the plurality of tasks and the output corresponding to the scenario; and generating the data collection trigger based on the distance measure exceeding a distance threshold.

Clause 8. The method of clause 1, further comprising: generating an indication of an uncertain scenario interpretation based on the consistency estimate being below the consistency threshold.

Clause 9. A vehicle comprising: at least one memory; and at least one processor communicatively coupled to the at least one memory and configured to: receive a plurality of outputs for a plurality of tasks from an advanced driving system (ADS), the plurality of tasks comprising a task to be verified and remaining tasks; determine a consistency estimate of one or more outputs of the task to be verified based on outputs of remaining tasks; and generate a data collection trigger based on the consistency estimate being below a consistency threshold.

Clause 10. The vehicle of clause 9, wherein the at least one processor is further configured to: collect data based on the data collection trigger; and add the collected data to one or more data sets for training the ADS.

Clause 11. The vehicle of clause 9, wherein the at least one processor configured to determine the consistency estimate is further configured to: determine a probability of an occurrence of the one or more outputs of the task to be verified given the outputs of the remaining tasks based on correlations between the plurality of tasks.

Clause 12. The vehicle of clause 11, wherein the at least one processor configured to determine the probability is further configured to: quantize an output space of one or more properties of the plurality of tasks; generate a probability distribution over the output space; and probe the probability distribution using the one or more properties to determine the probability of the occurrence of the one or more outputs of the task to be verified.

Clause 13. The vehicle of clause 11, wherein the at least one processor configured to determine the probability is further configured to: estimate, via a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

Clause 14. The vehicle of clause 9, wherein the at least one processor configured to determine the consistency estimate is further configured to: determine the consistency estimate of the occurrence of the one or more outputs of the task to be verified based on one or more conditional density estimation methods.

Clause 15. The vehicle of clause 9, wherein the at least one processor configured to determine the consistency estimate is further configured to: generate an output corresponding to a scenario based on the plurality of outputs of the plurality of tasks, the output comprising an interpretation of the scenario; determine a distance measure between the plurality of outputs of the plurality of tasks and the output corresponding to the scenario; and generate the data collection trigger based on the distance measure exceeding a distance threshold.

Clause 16. The vehicle of clause 9, wherein the at least one processor is further configured to: generate an indication of an uncertain scenario interpretation based on the consistency estimate being below the consistency threshold.

Clause 17. A vehicle comprising: means for receiving a plurality of outputs for a plurality of tasks from an advanced driving system (ADS), the plurality of tasks comprising a task to be verified and remaining tasks; means for determining a consistency estimate of one or more outputs of the task to be verified based on outputs of the remaining tasks; and means for generating a data collection trigger based on the consistency estimate being below a consistency threshold.

Clause 18. The vehicle of clause 17, further comprising: means for collecting data based on the data collection trigger; and means for adding the collected data to one or more data sets for training the ADS.

Clause 19. The vehicle of clause 17, wherein the means for determining the consistency estimate comprises: means for determining a probability of an occurrence of the one or more outputs of the task to be verified given the outputs of the remaining tasks based on correlations between the plurality of tasks.

Clause 20. The vehicle of clause 19, wherein the means for determining the probability comprises: means for quantizing an output space of one or more properties of the plurality of tasks; means for generating a probability distribution over the output space; and means for probing the probability distribution using the one or more properties to determine the probability of the occurrence of the one or more outputs of the task to be verified.

Clause 21. The vehicle of clause 19, wherein the means for determining the probability comprises: means for estimating, via a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

Clause 22. The vehicle of clause 17, wherein the means for determining the consistency estimate comprises: means for determining the consistency estimate of the occurrence of the one or more outputs of the task to be verified based on one or more conditional density estimation methods.

Clause 23. The vehicle of clause 17, wherein the means for determining the consistency estimate comprises: means for generating an output corresponding to a scenario based on the plurality of outputs of the plurality of tasks, the output comprising an interpretation of the scenario; means for determining a distance measure between the plurality of outputs of the plurality of tasks and the output corresponding to the scenario; and means for generating the data collection trigger based on the distance measure exceeding a distance threshold.

Clause 24. The vehicle of clause 17, further comprising: means for generating an indication of an uncertain scenario interpretation based on the consistency estimate being below the consistency threshold.

Clause 25. A non-transitory, processor-readable storage medium comprising processor-readable instructions to cause at least one processor of a vehicle to: receive a plurality of outputs for a plurality of tasks from an advanced driving system (ADS), the plurality of tasks comprising a task to be verified and remaining tasks; determine a consistency estimate of one or more outputs of the task to be verified based on outputs of the remaining tasks; and generate a data collection trigger based on the consistency estimate being below a consistency threshold.

Clause 26. The processor-readable storage medium of clause 25, wherein the processor-readable instructions further comprise processor-readable instructions to cause the one or more processors to: collect data based on the data collection trigger; and add the collected data to one or more data sets for training the ADS.

Clause 27. The processor-readable storage medium of clause 25, wherein the processor-readable instructions further comprise processor-readable instructions to cause the one or more processors to: determine a probability of an occurrence of the one or more outputs of the task to be verified given the outputs of the remaining tasks based on correlations between the plurality of tasks.

Clause 28. The processor-readable storage medium of clause 27, wherein the processor-readable instructions further comprise processor-readable instructions to cause the one or more processors to: quantize an output space of one or more properties of the plurality of tasks; generate a probability distribution over the output space; and probe the probability distribution using the one or more properties to determine the probability of the occurrence of the one or more outputs of the task to be verified.

Clause 29. The processor-readable storage medium of clause 27, wherein the processor-readable instructions further comprise processor-readable instructions to cause the one or more processors to: estimate, via a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

Clause 30. The processor-readable storage medium of clause 25, wherein the processor-readable instructions to cause the one or more processors to determine the consistency estimate further comprise process-readable instructions to cause the one or more processors to: determine the consistency estimate of the occurrence of the one or more outputs of the task to be verified based on one or more conditional density estimation methods.

Clause 31. The processor-readable storage medium of clause 25, wherein the processor-readable instructions to cause the one or more processors to determine the consistency estimate further comprise process-readable instructions to cause the one or more processors to: generate an output corresponding to a scenario based on the plurality of outputs of the plurality of tasks, the output comprising an interpretation of the scenario; determine a distance measure between the plurality of outputs of the plurality of tasks and the output corresponding to the scenario; and generate the data collection trigger based on the distance measure exceeding a distance threshold.

Clause 32. The processor-readable storage medium of clause 25, wherein the processor-readable instructions further comprise processor-readable instructions to cause the one or more processors to: generate an indication of an uncertain scenario interpretation based on the consistency estimate being below the consistency threshold.

Clause 33. A task-inconsistency based data collection trigger method, comprising: receiving a plurality of outputs for a plurality of tasks from an advanced driving system (ADS), the plurality of tasks comprising a task to be verified and remaining tasks; sending the plurality of outputs to a server; receiving a data collection trigger from the server, the data collection trigger being based on: a consistency estimate of one or more outputs of the task to be verified based on outputs of the remaining tasks; and the consistency estimate being below a consistency threshold; and collecting data based on the receipt of the data collection trigger.

Clause 34. The method of clause 33, further comprising: adding the collected data to one or more data sets for training the ADS.

Clause 35. A vehicle comprising: at least one memory; and at least one processor communicatively coupled to the at least one memory and configured to: receive a plurality of outputs for a plurality of tasks from an advanced driving system (ADS), the plurality of tasks comprising a task to be verified and remaining tasks; send the plurality of outputs to a server; receive a data collection trigger from the server, the data collection trigger being based on: a consistency estimate of one or more outputs of the task to be verified based on outputs of the remaining tasks; and the consistency estimate being below a consistency threshold; and collect data based on the receipt of the data collection trigger.

Clause 36. The vehicle of clause 35, wherein the at least one processor is further configured to: add the collected data to one or more data sets for training the ADS.

Clause 37. A vehicle comprising: means for receiving a plurality of outputs for a plurality of tasks from an advanced driving system (ADS), the plurality of tasks comprising a task to be verified and remaining tasks; means for sending the plurality of outputs to a server; means for receiving a data collection trigger from the server, the data collection trigger being based on: a consistency estimate of one or more outputs of the task to be verified based on outputs of the remaining tasks; and the consistency estimate being below a consistency threshold; and means for collecting data based on the receipt of the data collection trigger.

Clause 38. The vehicle of clause 37, further comprising: means for adding the collected data to one or more data sets for training the ADS.

Clause 39. A non-transitory, processor-readable storage medium comprising processor-readable instructions to cause at least one processor of a vehicle to: receive a plurality of outputs for a plurality of tasks from an advanced driving system (ADS), the plurality of tasks comprising a task to be verified and remaining tasks; send the plurality of outputs to a server; receive a data collection trigger from the server, the data collection trigger being based on: a consistency estimate of one or more outputs of the task to be verified based on outputs of the remaining tasks; and the consistency estimate being below a consistency threshold; and collect data based on the receipt of the data collection trigger.

Clause 40. The processor-readable storage medium of clause 39, wherein the processor-readable instructions further comprise processor-readable instructions to cause the one or more processors to: add the collected data to one or more data sets for training the ADS.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A task-inconsistency based data collection trigger method, comprising:

receiving a plurality of outputs for a plurality of tasks from an advanced driving system (ADS), the plurality of tasks comprising a task to be verified and remaining tasks;

determining a consistency estimate of one or more outputs of the task to be verified based on outputs of the remaining tasks and based on correlations between the plurality of tasks; and generating a data collection trigger based on the consistency estimate being below a consistency threshold, the data collection trigger causing collection of data for a scenario corresponding to the one or more outputs of the task to be verified and adding of the collected data to one or more data sets for training the ADS.

2. The method of claim 1, further comprising:

collecting data based on the data collection trigger; and adding the collected data to one or more data sets for training the ADS.

3. The method of claim 1, wherein the determining of the consistency estimate comprises: determining a probability of an occurrence of the one or more outputs of the task to be verified given the outputs of the remaining tasks based on correlations between the plurality of tasks.

4. The method of claim 3, wherein the determining of the probability comprises:

quantizing an output space of one or more properties of the plurality of tasks;

generating a probability distribution over the output space; and probing the probability distribution using the one or more properties to determine the probability of the occurrence of the one or more outputs of the task to be verified.

5. The method of claim 3, wherein the determining of the probability comprises: estimating, by a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

6. The method of claim 1, wherein the determining of the consistency estimate comprises: determining the consistency estimate of the occurrence of the one or more outputs of the task to be verified based on one or more conditional density estimation methods.

7. The method of claim 1, wherein the determining of the consistency estimate comprises:

generating an output corresponding to a scenario based on the plurality of outputs of the plurality of tasks, the output comprising an interpretation of the scenario;

determining a distance measure between the plurality of outputs of the plurality of tasks and the output corresponding to the scenario; and generating the data collection trigger based on the distance measure exceeding a distance threshold.

8. The method of claim 1, further comprising: generating an indication of an uncertain scenario interpretation based on the consistency estimate being below the consistency threshold.

9. A vehicle comprising:

at least one memory; and at least one processor communicatively coupled to the at least one memory and configured to:

receive a plurality of outputs for a plurality of tasks from an advanced driving system (ADS), the plurality of tasks comprising a task to be verified and remaining tasks;

determine a consistency estimate of one or more outputs of the task to be verified based on outputs of remaining tasks and based on correlations between the plurality of tasks; and generate a data collection trigger based on the consistency estimate being below a consistency threshold, the data collection trigger causing collection of data for a scenario corresponding to the one or more outputs of the task to be verified and adding of the collected data to one or more data sets for training the ADS.

10. The vehicle of claim 9, wherein the at least one processor is further configured to:

collect data based on the data collection trigger; and add the collected data to one or more data sets for training the ADS.

11. The vehicle of claim 9, wherein the at least one processor configured to determine the consistency estimate is further configured to: determine a probability of an occurrence of the one or more outputs of the task to be verified given the outputs of the remaining tasks based on correlations between the plurality of tasks.

12. The vehicle of claim 11, wherein the at least one processor configured to determine the probability is further configured to:

quantize an output space of one or more properties of the plurality of tasks;

generate a probability distribution over the output space; and probe the probability distribution using the one or more properties to determine the probability of the occurrence of the one or more outputs of the task to be verified.

13. The vehicle of claim 11, wherein the at least one processor configured to determine the probability is further configured to: estimate, via a classifier, the probability of the occurrence of the one or more outputs of the task to be verified using the plurality of outputs of the plurality of tasks as input, the classifier being trained using one or more outputs from unmodified samples in one or more training sets as positive samples and outputs combined from different samples as negative samples.

14. The vehicle of claim 9, wherein the at least one processor configured to determine the consistency estimate is further configured to: determine the consistency estimate of the occurrence of the one or more outputs of the task to be verified based on one or more conditional density estimation methods.

15. The vehicle of claim 9, wherein the at least one processor configured to determine the consistency estimate is further configured to:

generate an output corresponding to a scenario based on the plurality of outputs of the plurality of tasks, the output comprising an interpretation of the scenario;

determine a distance measure between the plurality of outputs of the plurality of tasks and the output corresponding to the scenario; and generate the data collection trigger based on the distance measure exceeding a distance threshold.

16. The vehicle of claim 9, wherein the at least one processor is further configured to: generate an indication of an uncertain scenario interpretation based on the consistency estimate being below the consistency threshold.

17. A vehicle comprising:

means for receiving a plurality of outputs for a plurality of tasks from an advanced driving system (ADS), the plurality of tasks comprising a task to be verified and remaining tasks;

means for determining a consistency estimate of one or more outputs of the task to be verified based on outputs of the remaining tasks and based on correlations between the plurality of tasks; and means for generating a data collection trigger based on the consistency estimate being below a consistency threshold, the data collection trigger causing collection of data for a scenario corresponding to the one or more outputs of the task to be verified and adding of the collected data to one or more data sets for training the ADS.

18. The vehicle of claim 17, further comprising:

means for collecting data based on the data collection trigger; and means for adding the collected data to one or more data sets for training the ADS.

19. The vehicle of claim 17, wherein the means for determining the consistency estimate comprises: means for determining a probability of an occurrence of the one or more outputs of the task to be verified given the outputs of the remaining tasks based on correlations between the plurality of tasks.

20. The vehicle of claim 17, wherein the means for determining the consistency estimate comprises:

means for generating an output corresponding to a scenario based on the plurality of outputs of the plurality of tasks, the output comprising an interpretation of the scenario;

means for determining a distance measure between the plurality of outputs of the plurality of tasks and the output corresponding to the scenario; and means for generating the data collection trigger based on the distance measure exceeding a distance threshold.

* * * * *